United States Patent
Spears

[15] 3,688,157
[45] Aug. 29, 1972

[54] MOTOR PROTECTION CONTROL APPARATUS

[72] Inventor: Joseph F. Spears, 4606 Pasadena, Midland, Tex. 79701

[22] Filed: Dec. 28, 1970

[21] Appl. No.: 101,726

[52] U.S. Cl. .................... 317/13 R, 307/93, 317/31, 317/61.5
[51] Int. Cl. ............................................. H02h 7/085
[58] Field of Search ....... 317/13 A, 13 R, 61.5, 18 D, 317/18 R, 31; 307/93

[56] References Cited

UNITED STATES PATENTS

| | | | |
|---|---|---|---|
| 3,283,236 | 11/1966 | Legg | 317/13 R |
| 2,391,672 | 12/1945 | Boehne et al. | 317/18 R |

Primary Examiner—James D. Trammell
Attorney—Joseph C. Kotarski, Henry H. Huth, Robert B. Coleman, Jr., William J. Miller and David H. Hill

[57] ABSTRACT

An electric motor protection control apparatus adapted to protect an electric motor being supplied operating power via power conductors, having surge voltage protection apparatus which is connected to the power conductors, generally between the motor starter contacts and the motor, the surge voltage protection apparatus being adapted and disposed to provide continuous surge voltage protection in an opened or a closed position of the motor starter contacts; and having a current sensing apparatus connected to each power conductor, each current sensing apparatus being adapted to sense the current in one of the power conductors, and to controllingly stop the motor when the current in any one of the power conductors reaches a preset high or a preset low current level.

18 Claims, 1 Drawing Figure

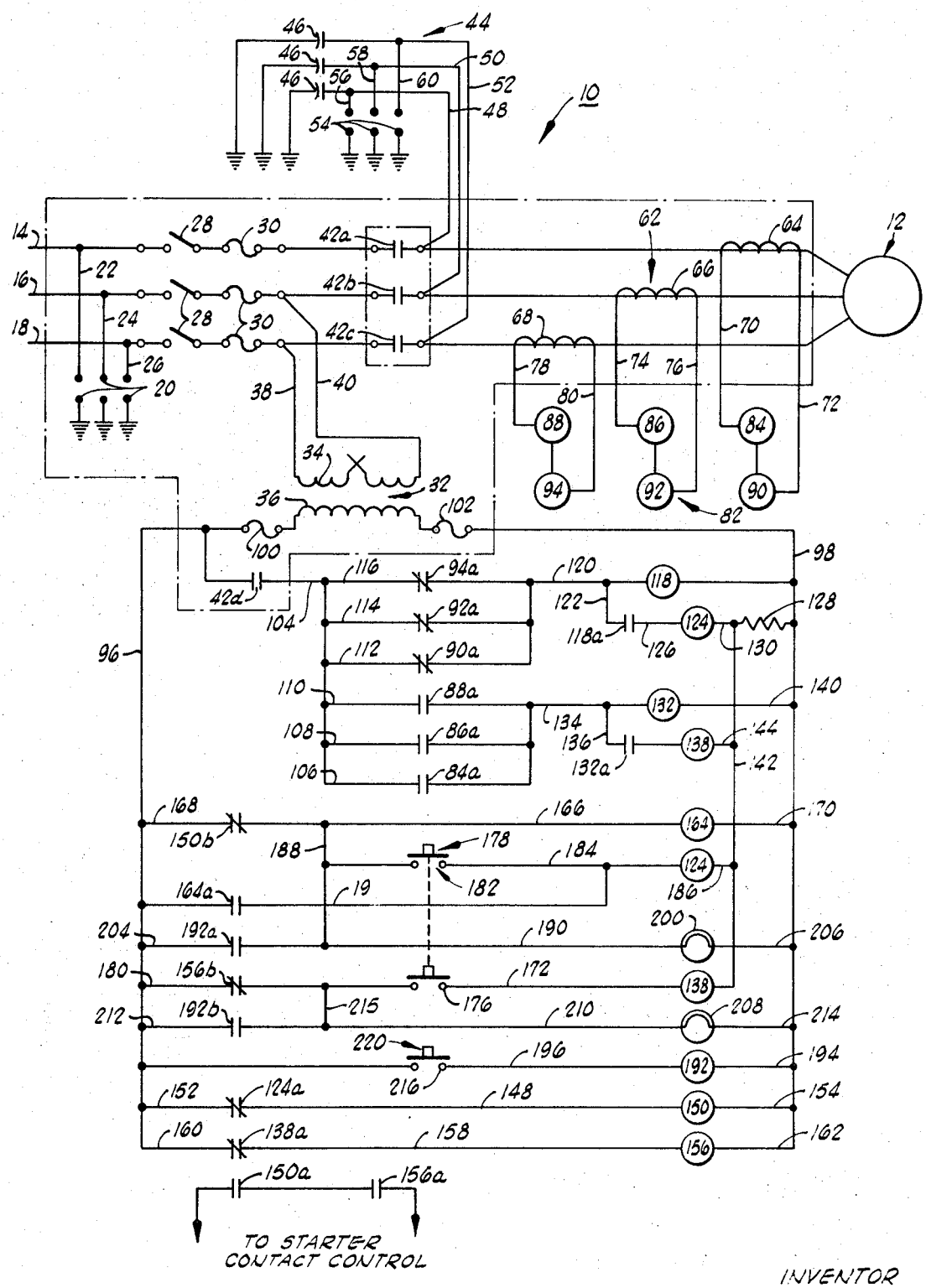

MOTOR PROTECTION CONTROL APPARATUS

BACKGROUND OF THE INVENTION

1. Field of the Invention

This invention relates generally to improvements in motor protection control apparatus, and more particularly, but not by way of limitation, to a motor protection control apparatus having a surge voltage and a current protection control.

2. Description of the Prior Art

Control protection apparatus adapted to protectively disconnect a motor from a power source upon preset or a predetermined condition being sensed by the particular control apparatus has been provided in various forms in the past. Functionally, this type of apparatus generally has ranged from providing a simple fuse in each power conductor to more elaborate and complex control circuitry adapted to sense predetermined conditions and to disconnect the motor from the power supply in response thereto.

One particular type of motor protection apparatus, which has been utilized in the past, has been a type of apparatus referred to generally in the art as a "lightning arrestor." The lightning arrestor is a type of apparatus which is designed to discharge a high surge voltage therethrough to an electrical ground. It has been common in the past to connect a lightning arrestor to each power conductor going to the motor at a position generally between the main disconnect switch and the power source. In most instances, the motor protection control apparatus having a lightning arrestor connected therein, as generally described above, has provided somewhat adequate protection in discharging surge voltages to an electrical ground.

In a motor protection control apparatus, as generally described above, the motor starter contacts were interposed in the power conductors generally between the main disconnect switch and the motor. Should the surge or peak voltage go through the motor starter contacts, the surge voltage was generally sensed by the motor protection control circuitry, thereby causing the motor contacts to be opened, and disconnecting the motor from the power supply. It has been found that not only did this condition result in the motor being disconnected from the power supply, but the opening of the motor starter contacts also isolated the surge voltage, which was already between the motor starter contacts in the motor, from the surge voltage protection apparatus or, in other words, the lightning arrestors. It was also found that a surge or peak voltage thus produced has a tendency to regenerate itself, in other words, the surge voltage between the motor starter contacts and the motor regenerated itself to such an extent that, in many instances, the motor was destroyed or seriously damaged thereby.

The regeneration of the surge voltage, as described above, is particularly important when considering motor protection control apparatus wherein there exists a relatively large distance between the motor protection control apparatus and the motor being thus protected such as, for example, when protecting a motor driving a submerged pump. In this type of application, the motor protection control apparatus was generally located at the surface, and the submerged pump was disposed in a well bore and, in many instances, the motor was, for example, 1,000 feet to 5,000 feet or more, from the motor protection control circuitry. Thus, in this type of application, when the motor starter contacts were opened by the surge voltage, the regenerated surge voltage was completely isolated from the surge voltage protection apparatus.

The motor protection control apparatus utilized in the past also included a current sensing apparatus which, in most instances, generally consisted of an overload relay being interposed in one of the power conductors. The main function of the overload relay was to disconnect THE motor from the power source upon sensing an overload current condition. The overload condition was sensed by the overload relays in the form of excess heat being created by the current passing therethrough. Since the overload relay was sensitive to current-resulting heat, it has been found that a time lag exists between the instant an overload condition occurs and actuation of the particular overload relay. Tests which have been conducted in the field have indicated that, in some instances, up to five minutes is required for overload relays of this type to actuate and, in this period of time, it has been found that in excess of 200 percent of the motor full load current has been flowing through the power conductors. I these instances, the excessive temperatures thus created have resulted in the motor being damaged or destroyed.

It should also be noted that when the current sensing apparatus was disposed and adapted to sense and respond to the current conditions in only one of the power conductors, the motor protection control apparatus has been found to be generally inadequate to provide the required motor protection in some applications.

There has thus developed a need to provide a motor protection control, responsive to high surge voltages and to high and low current conditions in the power conductors, which is fast, accurate, continuous, and economical. This need has been particularly salient in those applications where the motor protection control apparatus is remotely located with respect to the protected motor.

SUMMARY OF THE INVENTION

The present invention contemplates a motor protection control apparatus adapted to protect an electric motor, having a predetermined number of power conductors. The power conductors connect the motor to a power source, which is adapted to provide the operating power for the motor when in electrical continuity therewith. he motor control protection apparatus includes a starter contact interposed in each power conductor, each starter contact having an opened and a closed position, and being interposed in each power conductor generally between the motor and the power source. The starter contacts are adapted to provide electrical continuity between the power source and the motor via the power conductors in the closed position of the starter contacts. A starter contact control is connected to each starter contact. The starter contact control has an actuated and a non-actuated position, and is adapted to move the starter contacts to the closed position thereof, in the actuated position of the starter contact control. A surge voltage protection apparatus, adapted to discharge a surge voltage therethrough to an electrical ground, is connected to each power conductor generally between the starter contacts and the motor. The surge voltage protection apparatus is thus disposed and adapted to provide continuous surge voltage protection in the opened and the closed position of the starter contacts. A current sensing apparatus is inductively coupled to each power conductor, and each current sensing apparatus is adapted to sense the current flowing through the power conductor connected thereto, and to provide an output control signal voltage proportional to the sensed current. A current protection control is connected to the starter contact control and is adapted to receive the control signal voltage from the current sensing apparatus. The current protection control apparatus is adapted and disposed to deactuate the starter contact control upon receiving a preset high control signal voltage or a preset low control signal voltage, thereby stopping the motor or, in other words, disconnecting the motor from the power source.

An object of the invention is to provide a motor protection control apparatus having surge voltage protection.

Another object of the invention is to provide a motor protection control apparatus having a relatively continuous surge voltage protection in a disconnected position of the motor with respect to the power source.

A further object of the invention is to provide a motor protection control apparatus adapted to discharge high surge voltages regenerated between the starter contacts and the motor.

Another object of the invention is to provide a motor protection control apparatus adapted to provide protection in the event a high current condition exists in any one of the power conductors.

Yet a further object of the invention is to provide a motor protection control apparatus adapted to protect the motor in the event a low current condition exists in any one of the power conductors.

Another object of the invention is to provide a motor protection control apparatus adapted to controllingly respond to a high or a low current condition in any one of the power conductors.

One other object of the invention is to provide a motor protection control apparatus having an increased efficiency.

A still further object of the invention is to provide a motor protection control apparatus which is economical in construction and operation.

Other objects and advantages of the invention will be evident from the following detailed description when read in conjunction with the accompanying drawing which illustrates the single embodiment of the invention.

BRIEF DESCRIPTION OF THE DRAWING

The single FIGURE in the drawing schematically illustrates a motor protection control apparatus constructed in accordance with the present invention.

DESCRIPTION OF THE PREFERRED EMBODIMENT

Referring to the drawing, shown therein and designated by the general reference 10 is a motor protection control apparatus constructed and adapted to protect an electric motor designated in the drawing by the general reference 12, in a manner to be described in detail below. Operating power is supplied to the motor 12 by a power source (not shown) via a predetermined number of power conductors and, more particularly, as shown in the drawing, via three main power conductors 14, 16 and 18.

As shown in the drawing, a lightning arrestor 20 is connected to each power conductor 14, 16 and 18. More particularly, as shown in the drawing, one lightning arrestor 20 is connected to the power conductor 14 via a conductor 22; one lightning arrestor 20 is connected to the power conductor 16 via a conductor 24; and one lightning arrestor 20 is connected to the power conductor 18 via a conductor 26. The side of each lightning arrestor 20 opposite the side thereof connected to one of the power conductors 14, 16 or 18, is connected to an electrical ground, such as, for example, a well casing.

Each lightning arrestor 20 is constructed and adapted to discharge a surge voltage resulting, for example, from a lightning stroke, to an electrical ground. Lightning arrestors of the type generally described above are well known in the art, and no further detailed description is required herein.

A disconnect switch 28 is interposed in each power conductor 14, 16 and 18, generally between the power source or, more particularly, the lightning arrestor 20 connection and the motor 12. As shown in the drawing, the disconnect switches 28 are in the opened position, thereby interrupting electrical continuity between the motor 12 and the power source.

A fuse 30 is interposed in each power conductor, 14 16 and 18, generally between the disconnect switches 28 and the motor 12. Each fuse 30 is disposed and adapted to interrupt electrical continuity between the motor 12 and the power source when a predetermined high current is flowing through the power conductor 14, 16 or 18 in which the particular fuse 30 is interposed. It should be noted that fuses and disconnect switches of the nature generally described above with respect to the disconnect switches 28 and the fuses 30 are well known in the art, and further detailed description is not required herein.

The motor protection control apparatus 10 also includes a potential transformer 32 having a primary winding 34 and a secondary winding 36. One side of the primary winding 34 is connected to the power conductor 18 via a conductor 38, and the opposite side of the primary winding 34 is connected to the power conductor 16 via a conductor 40. The potential transformer 32 and, more particularly, the primary winding 34 and the secondary winding 36 are constructed and adapted to reduce the relatively large potential between the power conductors 16 and 18 to a relatively small control potential to be utilized in the control circuitry of the motor protection control apparatus 10, in a manner to be more fully described below.

As shown in the drawing, a starter contact 42 is interposed in each power conductor 14, 16 and 18, generally between the motor 12 and the power source. More particularly, a starter contact 42a is interposed in the power conductor 14; a starter contact 42b is interposed in the power conductor 16; and a starter contact 42c is interposed in the power conductor 18. The starter contacts 42a, 42b and 42c have an opened and a closed position and, as shown in the drawing, the starter contacts 42a, 42b and 42c are in the opened position. The starter contacts 42a, 42b and 42c are adapted and disposed to provide electrical continuity between the power source and the motor 12 via the conductors 14, 16 and 18 in the closed position of the starter contacts 42a, 42b and 42c. It should also be noted that, as shown in the drawing, the motor protection control apparatus 10 includes one other starter contact 42d which is interposed in the control circuitry, in a manner and for reasons to be described in more detail below.

The starter contacts 42a, 42b, 42c and 42d are connected to a starter contact control apparatus (not shown) having an actuated and a non-actuated position. The starter contact control apparatus is adapted to move each starter contact 42a, 42b, 42c and 42d to the closed position in the actuated position thereof, and to open the starter contacts 42a, 42b, 42c and 42d in the non-actuated position thereof.

As known in the art, starter contact control apparatus adapted to cooperate with the starter contacts as described above, generally comprises a holding coil having an actuated and a non-actuated position or, in other words, an energized and a de-energized position. A combination of such a holding coil or, in other words, a starter contact control apparatus and the cooperating starter contacts are well known in the art, and further detailed description of the construction and operation thereof is not required herein.

A peak or surge voltage protection apparatus 44 is connected to each power conductor 14, 16 and 18 on one side thereof, generally between the starter contacts 42a, 42b, and 42c and the motor 12, and to an electrical ground on the opposite side thereof. The surge voltage protection apparatus 44 is adapted to discharge a surge voltage there through to an electrical ground, thereby protecting the motor 12 or, more particularly, the windings of the motor 12 from peak or surge voltages in the power conductors 14, 16 and 18.

As shown in the drawing, a predetermined number of surge capacitors level more particularly, three surge capacitors 46 are connected on one side thereof to the power conductors 14, 16 and 18, and on the opposite side thereof to an electrical ground. More particularly, one surge capacitor 46 is connected to the power conductor 14 via a conductor 48; one surge capacitor 46 is connected to the power conductor 16 via a conductor 50, and one surge capacitor 46 is connected to the power conductor 18 via conductor 52. The surge capacitors 46 are each adapted and constructed to store a predetermined amount of peak voltage energy, and to discharge the stored energy to the electrical ground when the stored energy level in the surge capacitor 46 reaches a predetermined high level. Surge capacitors of the type generally described above with respect to the surge capacitors 46 are well known in the art and further detailed description of the construction and operation thereof is not required herein.

The surge voltage protection apparatus 44, as shown in the drawing, also includes a predetermined number of lightning arrestors 54, more particularly three lightning arrestors 54. Each lightning arrestor 54 is connected on one side thereof to one of the power conductors 14, 16 or 18, and on the opposite side thereof to an electrical ground. The lightning arrestors 54 are each adapted and constructed to discharge a predetermined energy level of surge voltage to an electrical ground, in a manner similar to that described before with respect to the lightning arrestors 20.

More particularly, as shown in the drawing, one of the lightning arrestors 54 is connected on one side thereof to the power conductor 14 via a conductor 56 which is connected to the conductor 48 generally between the surge capacitor 46 and the power conductor 14; one of the lightning arrestors 54 is connected on one side thereof to the power conductor 16 via a conductor 58 which is connected to the conductor 50 generally between the surge capacitor 46 and the power conductor 16; and one of the lightning arrestors 54 is connected to the power conductor 18 via a conductor 60 which is connected to the conductor 52 generally between the surge capacitor 46 and the power conductor 18. It is apparent from the foregoing and from the drawing, that each lightning arrestor 54 is electrically paralleled with one of the surge capacitors 46, and each lightning arrestor 54 is sized and adapted to cooperate with the surge capacitor 46 in parallel therewith to discharge an excess surge voltage in the power conductor 14, 16 or 18 connected thereto.

In a preferred form, the lightning arrestors 54 are sized and constructed to discharge a surge voltage when the energy level of the surge voltage reaches a level slightly below the predetermined surge voltage capacity of the cooperating surge capacitor 46. For example, when utilizing the lightning arrestors 54 and the surge capacitors 46 to protect a 1,200 volt motor 12, the surge capacitors 46 are preferably sized to discharge a surge voltage when the surge voltage reaches an energy level of approximately 2,400 volts. I other words, the discharge capacity of each surge capacitor 46, in a preferred form, is approximately twice the operating voltage of the motor 12. In this example, the lightning arrestors 54 would be sized and constructed to discharge a surge voltage when the surge voltage level reaches an amount slightly below the 2,400 volt capacity of the surge capacitors 46. For example, the lightning arrestors 54 might be sized to fire or discharge at a 2,000 volt energy level in this example.

It should be noted that in motor protection control apparatus utilizing only lightning arrestors to provide the surge voltage protection, that the lightning arrestor would fire or discharge at the first lightning stroke or, in other words, the first surge voltage peak. In such a system, once the lightning arrestor has been fired or discharged, the motor will operate without any surge voltage protection, until the fired lightning arrestor can be replaced.

As shown in the drawing, the motor protection control apparatus 10 also includes a current sensing apparatus 62 connected to each power conductor 14, 16 and 18. The current sensing apparatus 62 is adapted to sense the current flow in each power conductor 14, 16 and 18, and to provide an output control signal which is selectively proportional to the sensed current in each power conductor 14, 16 or 18, in a manner to be described in more detail below.

More particularly, and as shown in the drawing, the current sensing apparatus 62 includes three, phase current transformers 64, 66 and 68. The phase current transformer 76 is electrically connected to the power conductor 14 and, more particularly, the current transformer 64 is inductively coupled to the power conductor 14 in such a manner that the current flowing through the power conductor 14 induces an electrical current in the coil of the phase current transformer 64. The current thus induced in the coil of the phase current transformer 64 is electrically converted into an output control signal voltage. The phase current transformer 64 is thus constructed and adapted to sense the current in the power conductor 14 and to provide an output control signal voltage via a pair of conductors 70 and 72.

The phase current transformer 66 is electrically connected to and adapted to cooperate with the power conductor 16, in a manner similar to that described before with respect to the phase current transformer 64 and the power conductor 14. The phase current transformer 66 will thus provided an output control signal voltage via a pair of conductors 74 and 76, which is proportional to the sensed current flowing in the power conductors 16.

The phase current transformer 68 is electrically connected to and adapted to cooperate with the power conductor 18, in a manner similar to that described before with respect to the phase current transformer 64 and the power conductor 14. The phase current transformer 68 will thus provide an output control signal voltage via a pair of conductors 78 and 80, which is proportional to the sensed current flowing in the power conductors 18.

The motor protection control apparatus 10, as shown in the drawing, also includes a current protection control apparatus 82 which is connected to the starter contact control or, for example, the magnetic starter. The The current protection control 82 is adapted to receive the control signals from the current sensing means 62, and is disposed and adapted to deactuate the starter contact control or, for example, the magnetic starter upon receiving a preset high current control signal or a preset low current control signal from the current sensing apparatus 62, thereby disconnecting the motor 12 from the power source, in a manner to be described in detail below.

Particularly, and as shown in the drawing, the current protection control apparatus 82 includes three high current relays 84, 86 and 88. Each high current relay 84, 86 and 88 is constructed and adapted to receive the control signal from one of the phase current transformers 64, 66, or 68, and each high current relay 84, 86 and 88 is connected to the starter contact control and is adapted to deactuate the starter contact control upon receiving a preset high current control signal, in the manner to be described in detail below.

As shown in the drawing, the current protection control apparatus 82 also includes three low current relays 90, 92 and 94. Each low current relay 90, 92 and 94 is constructed and adapted to receive the control signal from one of the phase current transformers 64, 66 or 68, and each low current relay 90, 92 and 94 is connected to the starter contact control and adapted to deactuate a starter contact control upon receiving a preset low current control signal voltage.

More particularly, as shown in the drawing, the low current relay 90 is in series with the high current relay 84, and each is adapted to receive the control signal voltage from the phase current transformer 64 via the conductors 70 and 72. It is apparent from the foregoing that the high current relay 84 and the low current relay 90 each receive a control signal voltage which is proportional to the current flowing through the power conductor 14, and thus the high current relay 84 and the low current relay 90 are each responsive to the current flow through the power conductor 14.

The low current relay 92 is in series with the high current relay 86, and each is adapted to receive the control signal voltage from the phase current transformer 66 via the conductors 74 and 76. Thus, the high current relay 86 and the low current relay 92 are each responsive to the current flowing through the power conductor 16.

The low current relay 94 is in series with the high current relay 88, and each is adapted to receive the control signal voltage from the phase current transformer 68 via the conductors 78 and 80. Thus, the high current relay 88 and the low current relay 94 are each responsive to the current flowing through the power conductor 18.

Each high current relay 84, 86 and 88 has a set of cooperating contacts disposed therein, designated in the drawing by the reference numeral 84a, 86a, or 88a respectively. Each high current relay 84, 86 and 88 is constructed such that in the de-energized position thereof, as shown in the drawing, the cooperating relay contacts 84a, 86a or 88a thereof are in the open position. Each high current relay 84, 86 and 88 is therefore sized and constructed such that upon receiving a predetermined or a preset high current control signal voltage, the high current relay 84, 86 or 88 is energized, thereby closing the cooperating relay contact 84a, 86a or 88a.

Each low current relay 90, 92 and 94 has a set of cooperating relay contacts disposed therein and adapted to cooperate therewith, designated in the drawing by the reference numerals 90a, 92a and 94a. The relay contacts 90a, 92a and 94a are shown in the drawing in the de-energized position of the low current relays 90, 92 and 94 and, as shown in the drawing, the relay contacts 90a, 92a and 94a are in the closed position. Each low current relay 90, 92 and 94 is thus sized and constructed such that upon receiving a control signal voltage, the low current relay 90, 92 or 94 is energized and the cooperating relay contacts 90a, 92a and 94a are opened, and upon receiving a preset or predetermined low control signal voltage, the low current relay 90, 92 or 94 is de-energized.

It should be noted that the high current relays 84, 86 and 88, and the low current relays 90, 92 and 94 are particularly adapted to move the associated relay contacts to an opened or a closed position in a relatively short time, more particularly in the millisecond range, and the relay contacts 84a, 86a, 88a, 90a, 92a and 94a are, more particularly, disposed in the low voltage control circuitry of the motor protection control apparatus 10 and are connected therein, in a manner which will be described in detail below. Current relays constructed and adapted to operate in a manner as described above with respect to the high current relays 84, 86 and 88, and the low current relays 90, 92 and 94, are well known in the art and further detailed description is not required herein.

As mentioned before, the potential transformer 32 reduces the potential between the power conductors 16 and 18 to a small control potential which, as shown schematically in the drawing, is then utilized to provide the operating power for the low voltage control circuitry via the low voltage power conductors 96 and 98. A fuse 100 is interposed in the conductor 98 on one side of the secondary winding 36, and a fuse 102 is interposed in the conductor 96 on the opposite side of the secondary winding 36. The fuses 100 and 102 are sized and constructed to protect the low voltage control circuitry from a relatively high or excessive voltage, in a manner well known in the art.

As shown in the drawing, one of the starter contacts 42d is disposed in the low voltage control circuitry and, more particularly, is interposed in a conductor 104 which is connected on one end thereof to the conductor 96. The conductor 104 is also connected to one side of the relay contacts 84a, 86a, 88a, 90a, 92a and 94a via the conductors 106, 108, 110, 112, 114 and 116 respectively.

The relay contacts 90a, 92a and 94a, as shown in the drawing, are in parallel, and each is connected to a low current time delay relay 118 via a conductor 120. As shown in FIG. 1, the low current time delay relay 118 is in the de-energized position and has a pair of contacts, designated in the drawing by reference numeral 118a and shown therein in the closed position. One side of the relay contacts 118a is connected to the conductor 120 via a conductor 122, and the opposite side of the relay contacts 118a is connected to a low current position relay 124 via a conductor 126.

The low current time delay relay 118 is adapted to close the relay contacts 118a after the low current time delay relay 118 has been in the energized position, or in other words, after the low current time delay relay 118 has been provided energizing voltage for a preset or predetermined period of time. In a preferred form, the low current time delay relay 118 is preset to close the relay contacts 118a thereof after a small incremental period of time such as, for example, an incremental period of time less than one second, for reasons which will be made more apparent below.

The low current position relay 124 has a set of cooperating relay contacts, designated in the drawing, by the reference numeral 124a. As shown in the drawing, the low current position relay 124 is in the de-energized position, and in that position, the relay contacts 124a are closed.

The low current position relay 124 is connected to resistor 128 via a conductor 130, and the opposite side of the resistor 128 is connected to the conductor 98.

The relay contacts 84a, 86a, and 88a are in parallel, and are connected to one side of a high current time delay relay 132 via a conductor 134. The high current time delay relay 132 has a set of cooperating relay contacts, designated in the drawing by the reference numeral 132a, which are connected on one side thereof to the conductor 134 via a conductor 136. The opposite side of the relay contacts 132a is connected to a high current position relay 138.

The high current position relay 138 has a set of cooperating relay contacts therein, designated in the drawing by the reference numeral 138a. The relay contacts 138a are shown in the drawing in the closed position and in the de-energized position of the high current position relay 138.

The high current time delay relay 132 is connected to the conductor 98 via a conductor 140, and the high current position relay 138 is connected to a conductor 142 via a conductor 144. As shown in the drawing, the conductor 142 is also connected to the conductor 130 generally between the low current position relay 124 and the resistor 128, for reasons which will be made more apparent below.

The high current time delay relay 132 and the high current position relay 138 are constructed similar to the low current time delay relay 118 and the low current position relay 124, respectively. The high current time delay relay 132 and the high current position relay 138, however, and more particularly adapted to cooperate with the high current relays 84, 86 and 88 and the respective cooperating relay contacts 84a, 86a and 88a to stop the motor 12 or, in other words, disconnect the motor 12 from the power source upon a high current condition being sensed in any one of the power conductors 14, 16 or 18 in a manner to be described in more detail below.

The two position relays, 124 and 138 are of the type known in the art as a dual coil relay, and they are each constructed and adapted to either open or close the respective cooperating relay contacts, depending upon the last or subsequent position of the particular cooperating relay contacts. As shown in the drawing, in the de-energized position of the position relays 124 and 138, the respective cooperating relay contacts 124a and 138a are in the closed position. When the position relay 124 or 138 is energized, the cooperating relay contacts 124a or 138a will be opened and will remain opened until such time as energizing power is applied to the particular position relay 124 or 138, thereby closing the cooperating relay contacts 124a or 138a. Dual coil relays constructed similar to that described above with respect to the position relays 124 and 138 are well known in the art, and further detailed description of the construction and operation thereof is not required herein.

As shown in the drawing, the relay contacts 124a of the position relay 124 are connected in series via a conductor 148 with a two pole relay 150, and the relay contacts 124a and the two pole relay 150 are connected to the low voltage power supply, that is the conductors 96 and 98 via conductors 152 and 154. It is apparent from the foregoing that in the deenergized position of the position relay 124 (shown in the drawing), that the two pole relay 150 will be energized, since the relay contacts 124a of the position relay 124 are in the closed position.

As shown in the drawing, the relay contacts 138a are connected in series with a two pole relay 156 via a conductor 158. The relay contacts 138a and the two pole relay 156 are connected to the low voltage control power supply, that is the conductors 96 and 98 via a pair of conductors 160 and 162. It is apparent from the foregoing that in the de-energized position of the position relay 138 (shown in the drawing), that the two pole relay 156 will be energized, since the relay contacts 138a of the position relay 138 are in the closed position.

The two pole relay 150 has two sets of cooperating relay contacts, designated in the drawing by the reference numerals 150a and 150b. The relay contacts 150a are interposed in the starter contact control circuit, as indicated in the drawing, and in the de-energized position of the two pole relay 150, the relay contacts 150a are in the open position. The relay contacts 150a are thus interposed in the starter contact control circuit such that in the open position of the relay contacts 150a, electrical continuity is interrupted in the holding coil circuit, thereby de-energizing the holding coil and opening the starter contacts 42a, 42b, 42c, and 42d in a manner which will be made more apparent below.

The relay contacts 156a of the two pole relay 156 are also interposed in the starter contact control circuit, as indicated in the drawing, and, in the de-energized position of the relay 156, the relay contacts 156a are in the open position. The relay contacts 156a are disposed in the starter contact control circuit such that in the open position of the relay contacts 156a electrical continuity is interrupted in the holding coil circuit, thereby deactuating the starter contact control means and opening the starter contacts 42a, 42b, 42c, and 42d, in a manner and for reasons which will be made more apparent below.

The other relay contacts 150b of the two position relay 150 are connected in series with a time delay relay 164 via a conductor 166. The relay contacts 150b and the time delay relay 164 are also connected to the low voltage power supply, that is the conductors 96 and 98, via a pair of conductors 168 and 170. As shown in the drawing, in the de-energized position of the two pole relay 150, the relay contacts 150b are in the closed position, thereby providing energizing power to the time delay relay 164.

The time delay relay 164 has a set of cooperating relay contacts, designated in the drawing by the reference numeral 164a, and as shown in the drawing, the relay contacts 164a are in the open position when the time delay relay 164 is de-energized. The time delay relay 164 is constructed and adapted to close the relay contacts 164a thereof after the time delay relay 164 has been energized for a preset or a predetermined period of time. Relays constructed and adapted to operate in a manner similar to that described above with respect to the time delay relay 164 are well known in the art and further detailed description of the construction and operation thereof is not necessary herein.

The relay contacts 156b of the two pole relay 156 are in series with one coil of the dual coil relay, that is the position relay 138 via a conductor 172. As shown in the drawing, the electrical continuity of the conductor 172 is interrupted by a set of open contacts 176. The open contacts 176 cooperate with a reset actuator 178, in a manner to be described in detail below.

As shown in the drawing, the relay contacts 156b are connected to the low voltage power supply, more particularly, the conductor 96 via a conductor 180. It is thus apparent from the foregoing and from the drawing, that in the closed position of the relay contacts 156b, and in the actuated position of the reset actuator 178, thereby bridging the contacts 176, that one coil of the position relay 138 will be energized, for reasons to be made apparent below.

As shown in the drawing, the reset actuator 178 is also adapted to bridge a set of open contacts 182 which are interposed in a conductor 184. The conductor 184 is connected to the of the coils of the dual coil position relay 124, as indicated in the drawing, and the position relay 124 is connected to the conductor 142 via a conductor 186. The conductor 184 is connected to the low voltage control power supply, more particularly, the conductor 96 via a conductor 188 which is connected to the conductor 166, generally between the relay contacts 150b and the time delay relay 164. The conductor 188 is also connected to a conductor 190, for reasons to be made apparent below.

As shown in the drawing, the relay contacts 164a are connected to the conductor 184, generally between the contacts 182 and the position relay 124 via a conductor 191. The relay contacts 164a are also connected to the conductor 96 via a conductor 193, for reasons to be made more apparent below.

A light test relay 192 is connected on one side thereof, to the conductor 98 via a conductor 194, and on the opposite side thereof to the conductor 96 via a conductor 196. The light test relay 192 is a two pole relay having two sets of cooperating contacts, designated in the drawing by the reference numerals 192a and 192b.

As shown in the drawing, the relay contacts 192a and 192b are in the open position when the light test relay 192 is de-energized. The relay contacts 192a are in series with a low current light indicator 200 via the conductor 190. The relay contacts 192a and the low current light indicator 200 are connected to the low voltage power supply, that is the conductors 96 and 98 via a pair of conductors 204 and 206, respectively.

The relay contacts 192b are in series with a high current light indicator 208 via A conductor 210. The relay contacts 192b and the high current light indicator 208 are connected to the voltage power supply, that is the conductors 96 and 98, via a pair of conductors 212 and 214, respectively.

The relay contacts 156b are connected to the high current light indicator 208 via a conductor 215, for reasons to be made apparent below.

As shown in the drawing, the electrical continuity of the conductor 196 is interrupted by a pair of open contacts 216 which are interposed therein. The open contacts 216 interrupt the electrical continuity between the light test relay 192 and the low voltage control power supply provided via the conductors 96 and 98.

The motor protection control apparatus 10 includes a light test actuator 220 which is adapted to cooperate with the open contacts 216 such that in the actuated position of the light test actuator 220, electrical continuity is bridged across the open contacts 216, thereby providing electrical continuity between the light test relay 192 and the low voltage power supply via the conductors 194 and 196. In the deactuated position of the light test actuator 220, as shown in the drawing, electrical continuity in the conductor 196 is interrupted by the open contacts 216, and thus the light test relay 192 is not connected to the low voltage power supply, for reasons which will be made apparent below.

OPERATION THE MOTOR PROTECTION CONTROL APPARATUS

The motor protection control apparatus 10, shown in the drawing, and described in detail before is adapted to protect an electric motor 12, particularly with respect to peak or surge voltages in the power conductors 14, 16 or 18 and to disconnect the motor 12 from the power source in the event a high or a low current condition is sensed in any one of the power conductors 14, 16 or 18. For reasons which will become apparent below, the motor protection control apparatus 10 is particularly adapted to cooperate in the control circuitry of a motor protector wherein the prime-mover or motor is remotely located with respect to the control circuitry, as for example, in those instances where the motor 12 may be providing the power for a submerged pump which is disposed at a remote distance from the motor protection control apparatus 10.

The various relays and relay contacts and other components of the motor protection control apparatus 10, described before, are shown in the drawing, in the de-energized position. To start the motor 12, the disconnect switches 28 are initially moved to the closed position, and the starter contact control apparatus actuated, thereby closing the starter contacts 42a, 42b, 42c and 42d. This position of the motor protection control apparatus 10 will be referred to sometimes below as the operating position of the motor protection control apparatus 10, and in that position, electrical continuity is provided between the motor 12 and the power source (not shown) via the power conductors 14, 16 and 18.

In the operating position of the motor protection control apparatus 10, the potential transformer 32 will be providing a relatively low operating control voltage to the motor protection control circuitry via the conductors 96 AND 98, and the phase current transformers 64, 66 and 69 will each be sensing the current flow in one of the power conductors 14, 16 or 18. The phase current transformers 64, 66 and 68 will each be selectively providing an output control voltage, proportional to the current flowing through one of the power conductors 14, 16 or 18, connected respectively thereto.

The position of the various relays and the cooperating relay contacts associated therewith and the various other components of the motor protection control apparatus 10, in the operating position of the motor 12, is indicated in "Table I" as follows:

TABLE I

| Component Description | Position |
|---|---|
| Disconnect Switches 28 | Closed |
| Motor starter contacts 42A through 42D | Closed |
| High Current Relay 88 | De-energized |
| Relay Contact 88A | Open |
| High Current Relay 86 | De-energized |
| Relay Contact 86A | Open |
| High Current Relay 84 | De-energized |
| Relay Contact 84A | Open |
| Low Current Relay 94 | Energized |
| Relay Contact 94A | Open |
| Low Current Relay 92 | Energized |
| Relay Contact 92A | Open |
| Low Current RELAY () | Energized |
| Relay Contact 90A | Open |
| Low Current Time Delay Relay 118 | De-energized |
| Relay Contact 118A | Open |
| Position Relay 124 | De-energized |
| Relay Contact 124A | Closed |
| High Current Time Delay Relay 132 | De-energized |
| Relay Contact 132A | Open |
| Position Relay 138 | De-energized |
| Relay Contact 138A | Closed |
| Time Delay Relay 164 | De-energized |
| Relay Contact 164A | Open |
| Light Test Relay 192 | De-energized |
| Relay Contact 192A | Open |
| Two Pole Relay 150 | Energized |
| Relay Contact 150A | Closed |
| Relay Contact 150B | Open |
| Two Pole Relay 156 | Energized |
| Relay Contact 156A | Closed |
| Relay Contact 156B | Open |
| Reset Actuator 178 | Deactuated |
| Light Test Actuator 220 | Deactuated |
| Low Current Light Indicator 200 | Off |
| High Current Light INDICATOR 0)* | Off |

Since the low current relays 90, 92 and 94 are energized, in the operating position of the motor 12, the respective, cooperating relay contacts 90a, 92a and 94a will be in the open position, as indicated in Table I above. The high current relays 84, 86 and 88 are de-energized, and therefore the respective, cooperating relay contacts 84a, 86a and 88a are in the open position as indicated in Table I. Since the cooperating relay contacts of the high current relays 84, 86 and 88 and the cooperating relay contacts of the low current relays 90, 92 and 94 are in the open position, energizing power will not be provided to either the low current time delay relay 118 nor the high current time delay relay 132.

It follows from the foregoing, and is indicated in Table I, that the position relays 124 and 138 will each be de-energized, and therefore the cooperating relay contacts 124a and 138a will be in the closed position, thereby providing electrical continuity and thus energizing the two pole relays 150 and 156, respectively. Since the two, two pole relays 150 and 156 are energized, the cooperating relay contacts 150a and 156a, respectively, will be in the closed position, and in that position will maintain electrical continuity in the starter contact control circuitry, thereby maintaining the starter contact control apparatus in the actuated position thereof.

Should a surge or a peak voltage occur in any of the power conductors 14, 16 or 18 during the operation of the motor 12, such surge or peak voltage will be discharged to ground by the lightning arrestors 20 or the surge voltage protection apparatus 44. Referring more particularly to the surge voltage protection apparatus 44, in the event a surge or a peak voltage occurs in either power conductor 14, 16 or 18, the surge or peak voltage will be stored in one of the surge capacitors 46, and will be discharged to ground when the stored energy level reaches a predetermined discharge voltage. IN the event the surge or peak voltage, caused for example by a lightning stroke, exceeds the peak voltage or discharge capacity of one of the surge capacitors 46, the excess surge voltage will be discharged to ground via the lightning arrestor 54 which is in parallel with the particular surge capacitor 46.

More particularly, and as shown in the drawing, a surge or a peak voltage occuring in the power conductor 14 will be discharged to an electrical ground via the surge capacitor 46 and the cooperating lightning arrestor 54, which are connected to the power conductor 14 via the conductor 48. A surge or a peak voltage occuring in the power conductor 16 will be discharged to an electrical ground via the surge capacitor 46 and the cooperating lightning arrestor 54, which are connected to the power conductor 16 via the conductor 50, and a surge or a peak voltage occuring in the power conductor 18 will be discharged to ground via the surge capacitor 46 and the cooperating lightning arrestor 54, which are connected to the power conductor 18 via the conductor 52.

As mentioned before and as shown in the drawing, the surge capacitors 46 and the lightning arrestors 54 are each connected to one of the power conductors 14, 16 or 18 at a point generally between the starter contacts 42a, 42b and 42c and the motor 12. Thus should a surge or peak voltage occur in either power conductor 14, 16 or 18 which causes the motor protection control apparatus 10 to deactuate the starter contact control apparatus, thereby opening the starter contacts 42a, 42b, 42c, or should the surge or peak voltage cause the fuses 30 to interrupt the electrical continuity of the power conductors 14, 16 or 18, the surge voltage protection apparatus 44 and, particularly the surge capacitors 46 and the lightning arrestors 54 will continue to provide surge or peak voltage protection for the motor 12. This is particularly important when considering a motor protection control apparatus which is remotely disposed with respect to the prime mover or the motor. For example, should the motor 12 be located at a distance of 1,000 feet from the motor protection control apparatus, in many instances, it has been found that a surge or a peak voltage which might occur in the power conductors 14, 16 or 18, has a tendency to regenerate and rebuild after the starter contacts have been opened, generally between the starter contacts and the motor 12. In this latter event, the surge voltage protection apparatus 44 would continue to provide surge voltage or peak voltage protection with respect to each power conductor 14, 16 and 18, after the motor 12 has been disconnected from the power source.

The surge capacitors 46 are sized to discharge to ground most of the peak or surge voltages occurring in the power conductors 14, 16 or 18. In other words, and as mentioned before, the surge voltage capacitors 46 are generally sized to have a discharge capacity approximately twice the operating or phase voltage capacity of the protected motor 12. occurring in the power conductor 14, 16 or 18, that is the surge or peak voltages exceeding the discharge capacity of the surge capacitors 46, will be discharged to an electrical ground via one of the lightning arrestors 54. It is apparent from the foregoing, that the surge capacitors 46 and the lightning arrestors 54 are sized and connected to the power conductors 14, 16 and 18, to provide continuous surge voltage protection for the motor 12. Utilizing the combination of the surge capacitors 46 and the lightning arrestors 54, in a manner as described before, and being connected in parallel, a particular surge or peak voltage occurring in one of the power conductors 14, 16 or 18 will be discharged to an electrical ground in a manner which does not destroy the surge voltage protection, nor render useless the surge voltage protection of the motor protection control apparatus 10.

Should a high current condition exist in the power conductor 14, this high current condition will be sensed by the phase current transformer 64, and the output control signal provided by the current transformer 64 via the conductors 72 and 70 will increase proportionally to indicate a high current condition in the power conductor 14. The high current relay 84 is adapted to actuate or, in other words, to be energized by the control signal from the phase current transformers 64 when the control signal of the current transformer 64 reaches a preset or predetermined high level. The actuating level or energizing level of the high current relay 84 will of course depend upon the overload and operating voltage of the particular motor 12 being protected by the motor protection control apparatus 10.

Assuming the control signal from the phase current transformer 64 reaches or exceeds the energizing or actuating, preset level of the high current relay 84, the high current relay 84 will thus be energized. The cooperating relay contacts 84a of the high current relay 84 are connected or disposed in the motor protection control apparatus 10 such that when the high current relay 84 is energized, thereby indicating a high current condition in the power conductor 14, the motor protection control apparatus 10 will deactuate the starter contact control and thus open the starter contacts 42a, 42b, 42c and 42d, thereby disconnecting the motor 12 from the power source. The position of the various relays and cooperating relay contacts and the various other components of the motor protection control apparatus 10 upon a high current condition being sensed in the power conductor 14 is indicated in Table II below.

TABLE II

| Component Description | Position |
|---|---|
| Disconnect Switches 28 | Closed |
| Motor starter contacts 42A through 42D | Open |
| High Current Relay 88 | De-energized |
| Relay Contact 88A | Open |
| High Current Relay 86 | De-energized |
| Relay Contact 86A | Open |
| High Current Relay 84 | Energized |
| Relay Contact 84A | Closed |
| Low Current Relay 94 | Energized |
| Relay Contact 94A | Open |
| Low Current Relay 92 | Energized |
| Relay Contact 92A | Open |
| Low Current Relay 90 | Energized |
| Relay Contact 90A | Open |
| Low Current Time Delay Relay | De-energized |
| Relay Contact 118A | Open |
| Position Relay 124 | De-energized |
| Relay Contact 124A | Closed |
| High Current Time Delay Relay | Energized |
| Relay Contact 132A | Closed |
| Position Relay 138 | Energized |
| Relay Contact 138A | Open |
| Time Delay Relay 164 | De-energized |
| Relay Contact 164A | Open |
| Light Test Relay 192 | De-energized |
| Relay Contact 192A | Open |
| Two Pole Relay 150 | Energized |
| Relay Contact 150A | Closed |
| Relay Contact 150B | Open |
| Two Pole Relay 156 | De-energized |
| Relay Contact 156A | Open |
| Relay Contact 156B | Closed |
| Reset Actuator 178 | Deactuated |
| Light Test Actuator 220 | Deactuated |
| Low Current Light INDICATOR 0)) | Off |
| High Current Light Indicator 208 | On |

From the foregoing description and from Table II, it will be apparent that when a high current condition is sensed in the power conductor 14, thereby energizing the high current relay 84 and closing the cooperating relay contacts 84a therein, energizing power will be provided to the high current time delay relay 132 via the conductors 96 and 98 and the interconnecting conductor 134. After a preset period of time, the high current time delay relay 132 will close the cooperating relay contacts 132a, thereby providing energizing power to the position relay 138. As shown in Table II above, the time delay relay 132 has been energized for a sufficient period of time, generally a relatively short period of time, for example, less than one second, such that the relay contacts 132a have been moved to the closed position.

In the energized position of the position relay 138, the cooperating relay contacts 138a will be opened, thereby de-energizing the two pole relay 156. In the de-energized position of the two pole relay 156, the cooperating relay contacts 156a will be moved to the opened position, thereby interrupting electrical continuity in the motor starter contact control circuit.

When the electrical continuity is interrupted in the starter contact control apparatus, the starter control apparatus will be deactuated or moved to a non-actuated position, opening the starter contacts 42a, 42b, 42c and 42d, thereby disconnecting the motor 12 from the power source. It will be apparent from the foregoing and from Table II above, that the opening of the starter contact 42d will interrupt the electrical continuity between the conductor 96 and the conductor 104, thereby isolating or disconnecting the low current time delay relay and the high current time delay relay 132 from the low voltage power source provided via the conductors 96 and 98.

In this position of the motor protection control apparatus 10, as described above and as shown in Table II above, the relay contacts 156b will be moved to the closed position; however, the high current position relay 138 or, more particularly, one of the coils of the dual coil, high current position relay 138 will not be energized via the conductor 172, since the reset actuator 178 is in the deactuated position, as shown in the drawing. However, when the relay contacts 156b are moved to the closed position, energizing power is provided to the high light indicator 208 via the conductors 96, 98, 180, 172, 215, 210 and 214. Thus, the high current light indicator 208 is energized, thereby indicating a high current condition in one of the power conductors 14, 16 or 18. It should also be noted that a separate light indicator could be provided to indicate a high current condition in a specific power conductor 14, 16 or 18, the specific high current light indicators being connected in a manner similar to the high current light indicator 208, as described above.

It will be apparent from the foregoing to those skilled in the art, that once the motor protection control apparatus 10 has been actuated to a position as indicated in Table II, above, the only way to restart the motor 12 would be by actuating or depressing the reset actuator 178. When the reset actuator 178 is moved to the actuated position, thereby bridging the contacts 176, energizing power is provided to one of the coils of the dual coil position relay 138. When energizing power is thus provided to the position relay 138, as described above, the contacts 156a will be moved to the closed position, thereby providing electrical continuity in the starter contact control circuitry.

Thus, when the electrical continuity is again established in the starter contact control circuitry, the holding coil will again be energized, thereby closing the starter contacts 42a, 42b, 42c and 42d. If the high current condition remains or still exists in any one of the power conductors 14, 16 or 18, one of the current transformers 64, 66 or 68 will sense such a high current condition, and cooperating with one of the high current relays 84, 86 or 88 will again cause the motor 12 to be disconnected from the power source in a manner similar to that described above, with respect to a high current condition in the power conductor 14.

It will be apparent to those skilled in the art, that the phase current transformers 66 and 68 will cooperate with the high current relays 86 and 88, respectively, to sense a high current condition in the power conductors 16 or 18, respectively. The high current relays 86 and 88 will disconnect the motor 12 from the power source upon a preset or predetermined high current condition being sensed in the power conductor 16 or 18, in a manner similar to the high current relay 84, described in detail before.

In the event that one of the current transformers 64, 66 or 68 senses a predetermined or preset low current condition in one of the power conductors 14, 16 or 18, respectively, the control signal of the current transformer 64, 66 or 68 will be proportionally reduced. When the control signal reaches a preset or predetermined low level, one of the low current relays 90, 92 or 94 will be de-energized, and the motor protection control apparatus 10 will disconnect the motor 12 from the power supply, in a manner to be described in more detail below.

For example, should the current transformer 64 sense a low current condition in the power conductor 14, the control signal provided via the conductors 70 and 72 will be proportionally decreased. When that control signal voltage reaches a preset or predetermined low level, the low current relay 90 will be de-energized, thereby moving the cooperating relay contacts 90a to the de-energized or closed position, as indicated in the drawing. When the current transformer 64 has sensed a low current condition in the power conductor 14 and de-energized the low current relay 90, as described above, the various relays and cooperating relay contacts and the various other components of the motor protection control apparatus 10 will be moved to a position as indicated in Table III below.

TABLE III

| Component Description | Position |
| --- | --- |
| Disconnect Switches 28 | Closed |
| Motor starter contacts 42A through 42D | Open |
| High Current Relay 88 | De-energized |
|   Relay Contact 88A | Open |
| High Current Relay 86 | De-energized |
|   Relay Contact 86A | Open |
| High Current Relay 84 | De-energized |
|   Relay Contact 84A | Open |
| Low Current Relay 94 | Energized |
|   Relay Contact 94A | Open |
| Low Current Relay 92 | Energized |
|   Relay Contact 92A | Open |
| Low Current Relay 90 | De-energized |
|   Relay Contact 90A | Closed |
| Low Current Time Delay Relay 118 | Energized |
|   Relay Contact 118A | Closed |
| Position Relay 124 | Energized |
|   Relay Contact 124A | Open |
| High Current Time Delay Relay 132 | De-energized |
|   Relay Contact 132A | Open |
| Position Relay 138 | De-energized |
|   Relay Contact 138A | Closed |
| Time Delay Relay 164 | Energized |
|   Relay Contact 164A | Open* |
| Light Test Relay 192 | De-energized |
|   Relay Contact 192A | Open |
| Two Pole Relay 150 | De-energized |
|   Relay Contact 150A | Open |
|   Relay Contact 150B | Closed |

| | |
|---|---|
| Two Pole Relay 156 | Energized |
| Relay Contact 156A | Closed |
| Relay Contact 156B | Open |
| Reset Actuator 178 | Deactuated |
| Light Test Actuator 220 | Deactuated |
| Low Current Light Indicator 200 | On |
| High Current Light Indicator 208 | Off |

As indicated in Table III above, when the cooperating relay contacts 90a are moved to the closed position, the low current time delay relay 118 is provided energizing power via the conductors 014, 120, 96 and 98. After the low current time delay relay 118 has been thus energized for a preset or predetermined period of time, the cooperating relay contacts 118a will be moved to the closed position, as indicated in Table III above. In the closed position of the relay contacts 118a, the low current position relay 124 is energized, thereby opening the cooperating relay contacts 124a.

When the relay contacts 124a are moved to the open position, as described above and as shown in Table III above, the two pole relay 150 is de-energized, thereby opening the cooperating relay contacts 150a and closing the cooperating relay contacts 150b. The opening of the relay contacts 150a interrupts electrical continuity in the motor starter contact control circuit, thereby deactuating the starter contact control and opening the starter contacts 42a, 42b, 42c and 42d. The motor 12 is thus disconnected from the power source, and the high current relay contacts 84a, 86a and 88a, and the low current relay contacts 90a, 92a and 94a are isolated or disconnected from the low power control voltage provided via the potential transformer 32.

The closing of the relay contacts 150b provides electrical continuity between the conductors 96 and 98 and the low current indicator 200 via the conductors 168, 188, 190 and 206. The low current light indicator 200 is thus energized, indicating a low current condition in one of the power conductors 14, 16 or 18.

After the motor 12 has been disconnected from the power source upon the sensing of a low current condition in one of the power conductors 14, 16 or 18, in a manner as described above, the motor 12 can be restarted by depressing or actuating the reset button 178, thereby bridging the open contacts 182 and thus energizing one of the coils of the dual-coil, position relay 124. The energizing of the position relay 124 will cause the cooperating contacts 124a to be closed, thereby energizing the two pole relay 150 and closing the cooperating contacts 150a in the motor starter contact control circuit.

It is apparent from the foregoing, that when the motor 12 is disconnected from the power source upon a low current condition being sensed in one of the power conductors 14, 16 or 18, that the motor 12 can be restarted in a manner similar to that described with respect to a motor 12 shut-down upon the sensing of a high current condition by actuating or depressing the reset button 178. It should also be noted that on a low current condition, the motor protection control apparatus 10 is adapted to restart the motor 12 or, in other words, to again establish electrical continuity in the motor starter contact control circuit after a preset or predetermined period of time.

The closing of the contacts 150b, as indicated in the drawing, will energize the time delay relay 164. After the time delay relay 164 has been energized for a preset or a predetermined period of time, the cooperating relay contacts 164a will be moved to the closed position, thereby providing energizing current to one of the coils of the dual-coil, low current position relay 124. The energizing of the low current position relay 124, in a manner as described above, will cause the cooperating relay contacts 124a to be again moved to the closed position, thereby energizing the two pole relay 150 and closing the cooperating contacts 150a thereof. Thus, the time delay relay 164 cooperates in the control circuitry of the motor protection control apparatus 10 to re-establish electrical continuity in the motor starter contact control circuit after a predetermined period of time when the motor 12 has been shut-down in response to the sensing of a low current condition in one of the power conductors 14, 16 or 18. It should be noted that if the low current condition still exists in one of the power conductors 14, 16 or 18, after the time delay relay 164 has timed-out and thus closed the cooperating contacts 164a, the motor protection control apparatus 10 will then shut the motor 12 down or, in other words, disconnect the motor 12 from the power source, in a manner similar to that described before.

It will be apparent to those skilled in the art that the phase current transformers 66 and 68 will cooperate with the low current relays 92 and 94, respectively, to sense a low current condition in the power conductors 16 or 18, respectively. The low current relays 92 and 94 will disconnect the motor 12 from the power source upon a preset or predetermined low current condition being sensed in the power conductor 16 or 18, in a manner similar to the low current relay 90, described in detail before.

From the foregoing, it is apparent that the surge voltage protection apparatus 44 provides continuous surge voltage protection for the motor 12, in the closed and the opened position of the motor starter contacts 42. As mentioned before, having surge voltage protection of the nature described above with respect to the surge voltage protection apparatus 44 is particularly important when utilizing the motor protection control apparatus 10 in an application where there exists an opportunity for the surge or peak voltage to be regenerated generally between the motor starter contacts and the motor. In this instance, and if the peak voltage has subsequently caused the motor starter contacts to be opened, the regenerated surge voltage would be isolated from the surge voltage protection apparatus disposed generally between the motor starter contacts and the power source, thereby rendering such protection ineffective. The result of the surge voltage being regenerated in the manner described above would of course be that the motor 12 would be destroyed or, at least severely damaged.

The surge voltage protection apparatus 44 also utilizes a combination of surge capacitors and lightning arrestors to provide continuous protection. The surge capacitors 46 will normally discharge surge voltages to ground during the operation of the motor protection control apparatus 10. However, in the event a surge or peak voltage occurs in any one of the power conductors 14, 16 or 18, which exceeds the capacity of the surge capacitors, such excess is discharged to ground by the lightning arrestors 54.

In motor protection control apparatus having only lightning arrestors to provide the surge voltage protection, once the lightning arrestor has been discharged or fired, the surge voltage protection is rendered ineffective until a replacement can be installed. The parallel combination of surge capacitors 44 and lightning arrestors 54 in the motor protection control apparatus 10 thus operates to more effectively and more efficiently provide continuous surge voltage protection for the motor 12.

The current sensing apparatus 62, described in detail above, continually monitors the current conditions of each power conductor 14, 16 and 18, and cooperates with the other components of the motor protection control apparatus 10 to disconnect the motor 12 from the power source when a predetermined high or a predetermined low current condition is sensed in any one of the power conductors 14, 16 or 18.

It is apparent from the foregoing that the surge voltage protection apparatus 44 and the current sensing apparatus 62 cooperate in the motor protection control apparatus 10 to provide continuous, fast, and efficient motor protection. Thus, when the motor protection control apparatus 10 is being utilized to protect a motor driving a submerged pump, mentioned above, the motor protection contact apparatus 10 provides continuous, positive protection with respect to such conditions as, for example; power line single phase, voltage unbalance, locked pump rotor, fluid pump-off, blocked pump discharge and clogged pump suction, thereby substantially reducing the number of motor failures which presently occur in the operation of such motors.

Changes may be made in the construction and arrangement of the parts or the elements of the embodiment as disclosed herein without departing from the spirit and scope of the invention as defined in the following claims.

What is claimed is:

1. A motor protection control apparatus adapted to protect an electric motor having a predetermined number of power conductors connecting the motor to a power source, the power source thereby providing operating power to the motor when in electrical continuity therewith, comprising:

a starter contact means, having an opened and a closed position, interposed in the power conductors generally between the motor and the power source, the starter contact means being adapted to provide electrical continuity between the power source and the motor via the power conductors in the closed position of the starter contact means;

starter contact control means connected to the starter contact means, having an actuated and a non-actuated position, the starter contact control means being adapted to move the starter contact means to the closed position thereof in the actuated position of the starter contact control means;

a surge voltage protection means adapted to discharge a surge voltage therethrough to an electrical ground, the surge voltage protection means being connected to each power conductor generally between the starter contact means and the motor, thereby providing continuous surge voltage protection in the opened and the closed position of the starter contact means;

a current sensing means connect to each power conductor and being adapted to sense the current in each power conductor and to provide an output control signal for each power conductor selectively proportional to the sensed current in one of the power conductors; and current protection control means connected to the starter contact control means and being adapted to receive the output control signals from the current sensing means, the current protection control means being adapted and disposed to deactuate the starter contact control means upon receiving a preset high control signal or a preset low control signal from the current sensing means, thereby stopping the motor.

2. The motor protection control apparatus of claim 1 wherein the surge voltage protection means is defined further to include:

a surge capacitor means connected on one side thereof to each power conductor and on the opposite side thereof to an electrical ground, the surge capacitor means being adapted and constructed to store surge voltage energy and to discharge the stored energy to the electrical ground when the stored energy level reaches a predetermined high level.

3. The motor protection control apparatus of claim 1 wherein the surge voltage protection means is further defined to include:

a predetermined number of surge capacitor means, each surge capacitor means being connected on one side thereof to one power conductor and each surge capacitor being connected to an electrical ground on the opposite side thereof, each surge capacitor means being adapted and constructed to store surge voltage energy and to discharge the stored energy to the electrical ground when the stored energy level reaches a predetermined high level.

4. The motor protection control apparatus of claim 1 wherein the surge voltage protection means is defined further to include:

a lightning arrestor means connected on one side thereof to each power conductor and on the opposite side thereof to an electrical ground, the lightning arrestor means being adapted and constructed to discharge a predetermined energy level of surge voltage to the electrical ground.

5. The motor protection control apparatus of claim 1 wherein the surge voltage protection means is further defined to include:

a predetermined number of lightning arrestor means, each lightning arrestor means being connected on one side thereof to one power conductor and each lightning arrestor means being connected on the opposite side thereof to an electrical ground, each lightning arrestor means being adapted and constructed to discharge a predetermined energy level of surge voltage to the electrical ground.

6. The motor protection control apparatus of claim 1 wherein the surge voltage protection means is defined further to include:

a surge capacitor means connected on one side thereof to each power conductor and on the opposite side thereof to an electrical ground, the surge capacitor means being adapted and constructed to store surge voltage energy and to discharge the stored energy to the electrical ground when the stored energy level reaches a predetermined high level; and a lightning arrestor means connected on one side thereof to each power conductor and on the opposite side thereof to an electrical ground, the lightning arrestor means being adapted and constructed to discharge a predetermined energy level of surge voltage to the electrical ground.

7. The motor protection control apparatus of claim 6 wherein the surge voltage protection apparatus is defined further to include:

a predetermined number of surge capacitor means, each surge capacitor means being connected to one of the power conductors; and a predetermined number of lightning arrestor means, each lightning arrestor means being connected to one of the power conductors and in electrical parallel with one of the surge capacitor means.

8. The motor protection control apparatus of claim 7 wherein each lightning arrestor means is further defined as being constructed and adapted to discharge a surge voltage when the energy level of the surge voltage reaches a predetermined level slightly below the predetermined surge voltage energy discharge level of the surge capacitor means.

9. The motor protection control apparatus of claim 1 wherein the current sensing means is defined further to include:

a predetermined number of current sensing means, each current sensing means being connected to one of the power conductors; and wherein the current protection control means is further defined to include:

a predetermined number of current protection control means, each current protection control means being connected to one of the current sensing means and being adapted to receive the control signal from that one current sensing means.

10. The motor protection control apparatus of claim 9 wherein each current protection control means is defined further to include:

a high current relay means constructed and adapted to receive the control signal from one of the current sensing means, each high current relay means being connected to the starter contact control means and adapted to deactuate the starter contact control means upon receiving a preset high control signal; and a low current relay means constructed and adapted to receive the control signal from one of the current sensing means, each low current relay means being connected to the starter contact control means and adapted to deactuate the starter contact control means upon receiving a preset low control signal.

11. The motor protection control apparatus of claim 10 wherein each current protection control means is defined further to include:

a high current time delay relay means interposed between each high current relay means and the starter contact control means, the high time delay relay means being disposed and adapted to deactuate the starter contact control means when any one of the high current relay means receives a preset high control signal for a preset increment of time, the preset increment of time being controlled by the high current time delay relay means, thereby eliminating motor shut-downs on an incrementally small high current condition of a short duration.

12. The motor protection control apparatus of claim 10 wherein each current protection control means is defined further to include:

a low current time delay relay means interposed between each low current relay means and the starter contact control means, the low current time delay relay means being disposed and adapted to deactuate the starter contact control means when any one of the low current relay means receives a preset low control signal for a preset increment of time, the preset increment of time being controlled by the low current time delay relay means, thereby eliminating motor shut-downs on an incrementally small low current condition of a short duration.

13. The motor protection control apparatus of claim 12 wherein the current protection control means is defined further to include:

a time delay relay means connected to the low current time delay relay means, the time delay relay means being adapted to cooperate with the low current time delay relay means to actuate the starter contact control means after the starter contact control means has been deactuated for a preset increment of time, the increment of time being controlled by the time delay relay means.

14. The motor protection control apparatus of claim 1 defined further to include:

a reset means having an actuated and a deactuated position, connected to the starter contact control means, the reset means being adapted to actuate the starter contact control means in the actuated position of the reset means.

15. A motor protection control apparatus adapted to protect an electric motor having a predetermined number of power conductors connecting the motor to a power source, the power source thereby providing operating power to the motor when in electrical continuity therewith, comprising:

a starter contact means, having an opened and a closed position, interposed in the power conductors generally between the motor and the power source, the starter contact means being adapted to provide electrical continuity between the power source and the motor via the power conductors in the closed position of the starter contact means;

starter contact control means connected to the starter contact means, having an actuated and a non-actuated position, the starter contact control means being adapted to move the starter contact means to the closed position thereof in the actuated position of the starter contact control means; and a surge voltage protection means adapted to discharge a surge voltage therethrough to an electrical ground, the surge voltage protection means being connected to each power conductor generally between the starter contact means and the motor, thereby providing continuous surge voltage protection in the opened and the closed position of the starter contact means.

16. The motor protection control apparatus of claim 15 defined further to include:
   a second surge voltage protection means adapted to discharge a surge voltage therethrough to an electrical ground, the second surge voltage protection means being connected to each power conductor generally between the starter contact means and the power source.

17. A motor protection control apparatus adapted to protect an electric motor having a predetermined number of power conductors connecting the motor to a power source, the power source thereby providing operating power to the motor when in electrical continuity therewith, comprising:
   a starter means, having an actuated and a deactuated position, interposed in the power conductors generally between the motor and the power source, the starter means being adapted to provide electrical continuity between the power source and the motor via the power conductors in the actuated position of the starter means;
   a surge voltage protection means adapted to discharge a surge voltage therethrough to an electrical ground, the surge voltage protection means being connected to each power conductor generally between the starter means and the motor, thereby providing continuous surge voltage protection in the actuated and the deactuated position of the starter means;
   a current sensing means connected to each power conductor and being adapted to sense the current in each power conductor and to provide an output control signal for each power conductor proportional to the sensed current in one of the power conductors; and
   current protection control means connected to the starter means and being adapted to receive the control signals from the current sensing means, the current protection control means being adapted and disposed to deactuate the starter means upon receiving a preset high control signal or a preset low control signal from the current sensing means, thereby stopping the motor.

18. The motor protection control apparatus of claim 17 wherein the current sensing means is further defined as being a predetermined number of current transformers, one transformer being inductively coupled to each power conductor.

* * * * *